H. H. HOLDAWAY.
VEHICLE TIRE.
APPLICATION FILED DEC. 14, 1915.

1,345,777.	Patented July 6, 1920.

Witness:	Inventor.
E. R. Pollard	Hall H. Holdaway.
By Cassell Severance
Atty.

UNITED STATES PATENT OFFICE.

HALL H. HOLDAWAY, OF LOS ANGELES, CALIFORNIA, ASSIGNOR, BY MESNE ASSIGNMENTS, TO THE ADAMS-CAMPBELL COMPANY, INCORPORATED, A CORPORATION OF CALIFORNIA.

VEHICLE-TIRE.

1,345,777.

Specification of Letters Patent.

Patented July 6, 1920.

Application filed December 14, 1915. Serial No. 66,731.

*To all whom it may concern:*

Be it known that I, HALL H. HOLDAWAY, a citizen of the United States, residing at Los Angeles, in the county of Los Angeles and State of California, have invented certain new and useful Improvements in Vehicle-Tires, of which the following is a specification.

This invention relates to improvements in tires for vehicle wheels and particularly such as are suited for motor vehicles of various kinds.

It is an object of the invention to provide a tire having distending tread members capable of holding the tire in load supporting position, the said tire being also provided with supplemental pneumatic distending means.

It is also an object of the invention to provide a vehicle tire having spring and pneumatic means for exerting the proper tension upon the tread portion of the tire for supporting the vehicle with a resilient support.

It is a further object of the invention to provide a tire in which the casing is formed with spring rings in the tread thereof, embedded in the material of the tire, and in which a pneumatic tube is also employed for further distending the casing and for holding the tread springs in proper position.

With these and other objects in view the invention comprises certain novel constructions, combinations and arrangements of parts as will be hereinafter more fully described and claimed.

In the accompanying drawing forming a part of this specification—

Figure 1:
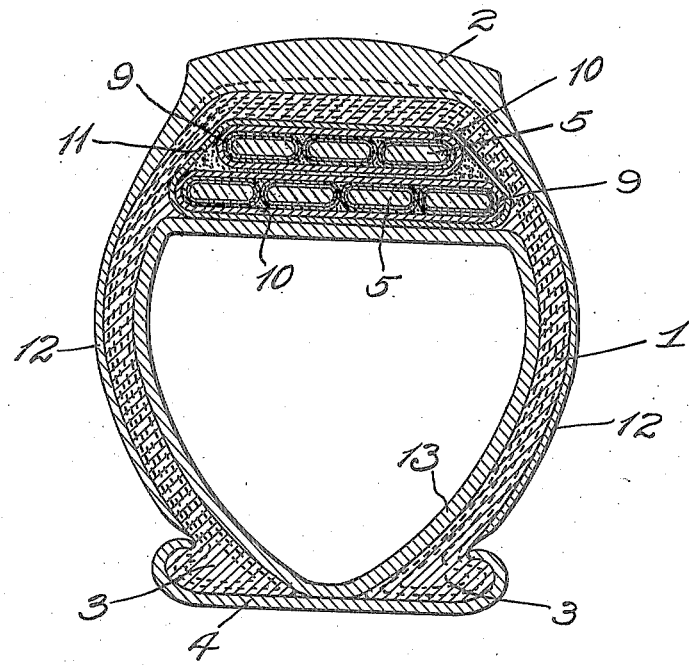
Figure 1 is a transverse sectional view taken through an improved tire constructed in accordance with the present invention.
Figure 2:
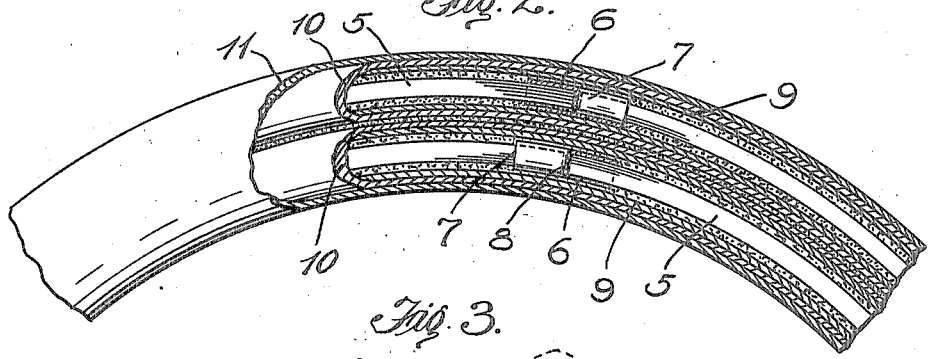
Fig. 2 is a view partially in longitudinal section and partially in side elevation of a portion of the tire.
Figure 3:
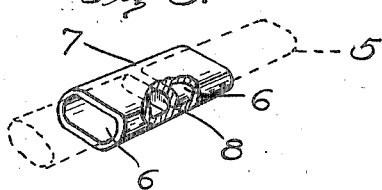
Fig. 3 is a detail perspective view of one of the spring holding couplings, a portion being broken away to show the internal construction.

The tire of the present invention is designed to supply one in which the exterior surface of the casing may be made substantially like the usual forms of pneumatic tires in common use, but to provide a combined spring and pneumatic means for keeping the casing in distended form when in use and supporting a load. With this purpose in view the tire is constructed with tread distending springs of suitable strength for approximately supporting the load carried by the tire, the remainder of the tire however being interiorly occupied by an inflation tube of usual construction. A preferred embodiment of the invention is disclosed in the drawing in which 1 indicates the fabric portion of a casing and 2 the tread surface thereof while 3 indicate clencher edge portions adapted to fit within the clencher portions of a rim as 4. The body portion of the casing is formed of the usual friction fabric which when vulcanized becomes an integral part of the casing. Within the tread portion of the tire fabric, in staggered relationship, radially, a plurality of flat rings 5 of spring material are embedded. Each one of these rings 5 is preferably formed of a somewhat flattened steel bar preferably rounded at its edges to prevent its cutting into the rubber. The arrangement of these flat rings in staggered relationship radially, prevents any puncturing article from penetrating through to the inner tube. The ends of the bars of which the rings 5 are made are brought together and inserted in recesses or pockets 6 formed in the opposite ends of ferrules or coupling pieces 7 such as is clearly shown in Fig. 3 of the drawing. The ferrule is formed with a central partition 8 against which the ends of the steel bars abut whereby the ferrule will extend equal distances upon each end of the bar forming the ring. They are then preferably arranged in one or more groups, and each group is covered and held together by a friction fabric cover 10. Those rings which are arranged in a group are preferably of the same diameter so that they are usually arranged side by side in the same or approximately the same plane. Where more than one group is used the different groups are also bound together and covered by a layer of friction fabric 11. The arrangement shown in Fig. 1 of the drawing embraces an inner group of four spring rings and an outer group of three thus affording a very substantial tread distending means for the casing. The bound or covered rings and the groups are then put in position within the tread of the casing and the vulcanizing of the whole structure thoroughly incorporates the spring rings within the body portion of the casing itself. The rubber material between the rings within the fabric is placed there before vulcanization. Each ring has, as here shown, two layers or coverings, such, for example, as rubber gum, covered with a layer of friction fabric, as indicated at 9. In a tire of the type shown the outer tread of rubber is preferably rounded slightly and portions from the edges thereof are carried well around the sides of the casing as at 12 so as to reach approximately to the clencher edges of the casing. This outer rubber may be molded or otherwise placed upon the casing as found preferable. It will be understood that any number of spring rings may be used and any arrangement or grouping of the same without departing in the least from the spirit of the invention.

The space within the side walls of the casing and inside the tread springs is preferably filled by an inflatable tube 13 of any usual or ordinary construction. The said tube when inflated serves to further distend the casing, especially at the sides for rounding it out to its proper shape, and tends also to hold the groups of rings in their proper position in the tread of the casing. The inflation tube also holds the clencher edges of the tire in locked engagement with the clencher flanges of the rim 4, as in other inflation tube tires.

The structure is possessed of many valuable features for the spring rings in the tread are usually made strong enough to prevent a flat tire in the event of the air escaping from the inflation tube. The inflation tube also being merely an auxiliary distending means in the casing, does not require as high a degree of inflation as if it was the sole support of the loads imposed upon the tire. The inflation tube is however practically puncture proof because of the protection afforded by the spring rings in the tread of the casing. The arrangement of the rings when grouped is also such that the spaces between them cannot be penetrated for each space is guarded by the ring of an adjacent group. The device may be considerably altered as to the arrangement of the tread distending rings and as to their number, all within the spirit and scope of this invention.

What is claimed is:

1. A vehicle tire casing provided in the tread thereof with two groups of ring members, one group being of less width and outside of the other group, said rings being made of flat spring material, each of said rings being covered, and means binding said rings together side by side in each group, and means binding the two groups together within said tread, substantially as described.

2. A vehicle tire having spring rings in the tread thereof, coverings for said individual rings, coverings incasing groups of said rings, means for holding the said rings in proper position and auxiliary pneumatic means coöperating with the said rings.

3. A vehicle tire comprising a casing having layers of fabric constituting the body portion thereof, a series of rings of spring material embedded in the tread portion of the casing, tire fabric incasing each of said rings, a tire fabric incasing the series of rings, and an inflation member arranged within the rings for keeping them in position and for assisting in the distending of the tire casing.

4. A tire comprising a casing, a distending tread member therefor made up of a plurality of resilient rings having separate coverings of rubber gum applied thereto, separate coverings of friction fabric applied to said rubber gum, and outer inclosing coverings of friction fabric, the structure being such that when the casing is vulcanized, the resilient rings will be firmly embedded in and separated from each other by elastic and anti-friction material.

5. A tire of the character referred to, comprising a casing, an inner air tube and puncture preventing means interposed between said inner air tube and the outer tread portion of said casing and comprising an outer set of flat spring rings arranged side by side in the same plane, in cross section, and an inner set of flat spring rings arranged side by side in the same plane, in cross section, and means flexibly holding said flat spring rings in their positions, substantially as shown and described.

In testimony whereof I have hereunto set my hand, in presence of two witnesses.

HALL H. HOLDAWAY.

Witnesses:
　CASSELL SEVERANCE,
　EARLE R. POLLARD.